(12) United States Patent
Swindell (10) Patent No.: US 8,677,459 B2
(45) Date of Patent: Mar. 18, 2014

(54) SECURE ZERO-TOUCH PROVISIONING OF REMOTE MANAGEMENT CONTROLLER

(75) Inventor: Robert Ray Swindell, Norco Hills, CA (US)

(73) Assignee: Broadcom Corporation, Irvine, CA (US)

( * ) Notice: Subject to any disclaimer, the term of this patent is extended or adjusted under 35 U.S.C. 154(b) by 966 days.

(21) Appl. No.: 12/551,068

(22) Filed: Aug. 31, 2009

(65) Prior Publication Data

US 2011/0040933 A1 Feb. 17, 2011

Related U.S. Application Data

(60) Provisional application No. 61/233,050, filed on Aug. 11, 2009.

(51) Int. Cl.
H04L 29/06 (2006.01)
(52) U.S. Cl.
USPC .............................. 726/4; 726/5; 726/6; 726/7
(58) Field of Classification Search
USPC ......................................................... 726/4–7
See application file for complete search history.

(56) References Cited

U.S. PATENT DOCUMENTS

| | | | | |
|---|---|---|---|---|
| 8,185,936 B1 * | 5/2012 | Reeves et al. | | 726/5 |
| 2002/0169983 A1 * | 11/2002 | Rygaard | | 713/201 |
| 2004/0236958 A1 * | 11/2004 | Teicher et al. | | 713/193 |
| 2005/0136968 A1 * | 6/2005 | Nakayama et al. | | 455/550.1 |
| 2005/0235282 A1 * | 10/2005 | Anderson | | 717/178 |
| 2006/0106836 A1 * | 5/2006 | Masugi et al. | | 707/101 |
| 2006/0160626 A1 * | 7/2006 | Gatto et al. | | 463/43 |
| 2006/0225137 A1 * | 10/2006 | Odins-Lucas et al. | | 726/27 |
| 2006/0286937 A1 * | 12/2006 | Russell et al. | | 455/67.11 |
| 2008/0148060 A1 * | 6/2008 | Thorell | | 713/187 |
| 2010/0250946 A1 * | 9/2010 | Korte et al. | | 713/175 |

* cited by examiner

Primary Examiner — Justin T Darrow
(74) Attorney, Agent, or Firm — Sterne, Kessler, Goldstein & Fox P.L.L.C.

(57) ABSTRACT

Embodiments enable secure zero-touch remote provisioning/management of a computer system. A computer system is shipped to end customers with its remote management controller enabled but not provisioned. During automatic testing, for example, provisioning authentication data is embedded into the remote management controller. The computer system vendor harvests the provisioning authentication data or derivative data therefrom from the remote management controller and stores it in a database. Upon sale of the computer system, the computer system vendor provides to the end-customer the harvested data of the computer system's remote management controller. The end-customer can then remotely authenticate a remote provisioning/management console to the remote management controller. Once successfully authenticated, the remote provisioning/management console can provision the remote management controller with one or more user accounts/roles with corresponding authentication details, authenticate as one of the provisioned user accounts, and perform computer system provisioning using remote manageability functions as desired.

32 Claims, 9 Drawing Sheets

SECURE ZERO-TOUCH PROVISIONING OF REMOTE MANAGEMENT CONTROLLER

CROSS-REFERENCE TO RELATED APPLICATIONS

The present application claims the benefit of U.S. Provisional Patent Application No. 61/233,050, filed Aug. 11, 2009, which is incorporated herein by reference in its entirety.

BACKGROUND

1. Field of the Invention

The present invention relates generally to secure remote provisioning and management of computer systems.

2. Background Art

Conventionally, computer systems are physically shipped from manufacturers to customers with their remote management controllers disabled for security reasons. This prevents computer systems from being remotely configured and managed securely without initial manual configuration.

BRIEF SUMMARY

The present invention relates generally to secure remote provisioning and management of computer systems.

Embodiments enable secure zero-touch remote provisioning and management of a computer system. In embodiments, a computer system is shipped to an end customer with its remote management controller enabled but not provisioned. Further, during automatic testing (ATE), for example, provisioning authentication data is embedded into the remote management controller. Embodiments allow the computer system vendor to harvest the provisioning authentication data or derivative data therefrom from the remote management controller and to store the harvested data in a database. Upon sale of the computer system, the computer system vendor provides to the end-customer the provisioning authentication data or the derivative data therefrom of the computer system's remote management controller. According to embodiments, the end-customer can then remotely authenticate a remote provisioning console to the remote management controller. Once successfully authenticated, the remote provisioning console can provision (i.e., set up) the remote management controller with one or more user accounts/roles with corresponding authentication details. Subsequently, a remote management console (which may be the same or a different console than the remote provisioning console) can use one of the provisioned user accounts to perform further system provisioning/management (e.g., power control, boot control, boot media redirection, console redirection, etc.) as desired.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 9 is an example computer system useful for implementing embodiments of the present invention The present invention will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
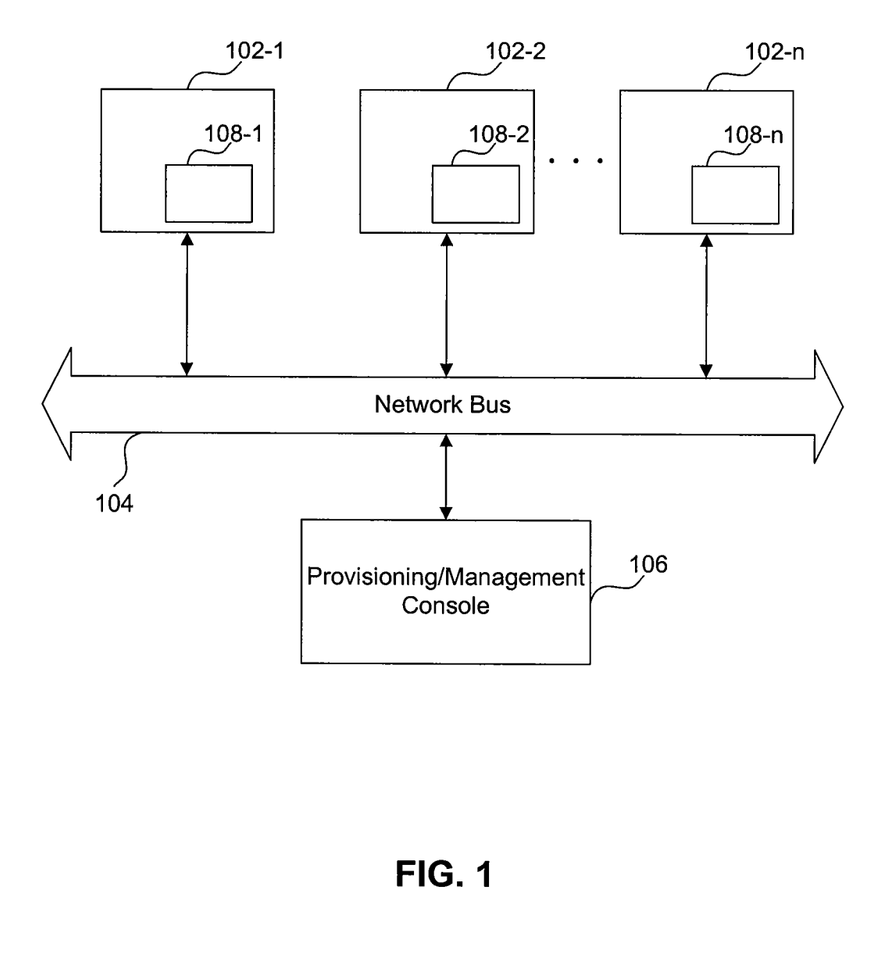
FIG. 1 illustrates the remote provisioning/management of a plurality of computer systems.

FIG. 1 illustrates the remote provisioning/management of a plurality of computer systems. In particular, FIG. 1 shows a remote provisioning/management console 106 connected through a network bus 104 to a plurality of computer systems 102. Remote provisioning/management console 106, generally under the control of an administrator, performs remote configuration (provisioning) and management of computer systems 102.

Typically, remote provisioning/management is enabled by remote (out-of-band) management controllers 108 embedded within computer systems 102. Remote management controllers 108 allow remote console 106 to provision/manage the computer systems 102.

It is noted that while in FIG. 1 and in the foregoing remote provisioning and management are described as being performed by a single console 106, it is possible that separate consoles (i.e., separate provisioning and management consoles) are used to perform provisioning and management. For example, separate consoles can be used to perform provisioning of the remote management controller 108, provisioning of the computer system 102, and management of the computer system 102.

One of the remote management features enabled by a remote management controller is remote power control. Remote power control allows a remote provisioning/management console, once successfully authenticated by the remote management controller, to remotely boot the computer system and to manage the computer system as desired.

Conventionally, for security reasons, computer systems (e.g., laptops, notebooks, desktops, workstations, and servers) ship to end customers with the remote management controller completely disabled. Therefore, the remote management controller needs to be enabled and provisioned (i.e., set up with user accounts, authentication credentials, etc.) before it can be used to support secure remote manageability functions (e.g., power control) of the computer system. However, conventionally, enabling and provisioning the remote management controller requires manual configuration of the computer system. This includes connecting input and output devices (e.g., keyboard, monitor, etc.) to the computer system and manually booting the computer system to a functional operating system (OS), before initial configuration parameters of the remote management controller can be set up using system vendor supplied software. As a result, conventionally, the remote management controller may not be used for secure remote system provisioning (e.g., hard disk imaging, OS configuration, etc.).

Accordingly, embodiments of the present invention recognize that when the remote management controller is enabled and provisioned, remote provisioning/management of the computer system 102 simply requires that the computer system is connected to the network and to a power source. In other words, hands-free (zero-touch) remote provisioning/management can be achieved.

However, with the remote management controller enabled or enabled and provisioned at manufacture time, embodiments recognize that certain security issues arise. For example, if the remote management controller is enabled but not provisioned, then remote authentication by a remote provisioning/management console for the purpose of remote manageability functions (e.g., power control) cannot be performed, and as a result secure remote provisioning/management would also not be possible. In such a case, the remote management controller cannot be used for more than remote system discovery (i.e., to remotely discover the computer system associated with the remote management controller). On the other hand, if the remote management controller is enabled and provisioned (i.e., pre-configured with a default user account with known default username and password), then the security of the computer system would be compromised as IT personnel may not necessarily change the default login credentials or disable the default user account before deploying the systems.

Embodiments of the present invention, as will be further described below, enable secure zero-touch remote provisioning/management of computer systems. This includes secure zero-touch provisioning of the remote management controller, which enables subsequently secure zero-touch provisioning/management of the computer system associated with the remote management controller. In embodiments, computer systems are shipped to end customers with the remote management controller enabled but not provisioned. In addition, during automatic testing (ATE) of the remote management controller, for example, provisioning authentication data is embedded into the remote management controller. Embodiments allow computer system vendors to harvest the provisioning authentication data or derivative data therefrom from the remote management controller and to store the harvested data in a database, associating the harvested data of each remote management controller with its associated computer system. Subsequently, upon sale of the computer system, the computer system vendor provides to the end-customer (e.g., end-customer IT personnel) the harvested data of the computer system's remote management controller. According to embodiments, the end-customer can then remotely authenticate a remote provisioning console (using the harvested data) to the remote management controller. Once successfully authenticated, the remote provisioning console can provision (i.e., set up) the remote management controller with one or more user accounts/roles with corresponding authentication details. Subsequently, a remote provisioning/management console (which may be the same or a different console than the remote provisioning console) can use one of the provisioned user accounts to perform further system provisioning/management (e.g., power control, boot control, boot media redirection, console redirection, etc.) as desired.

Thus, embodiments allow for the secure provisioning of an enabled remote management controller. Further, because the provisioning authentication data (or derivative data therefrom) is provided only to the end-customer and is not known or available publicly, security risks are significantly reduced. Detailed description of example embodiments will now be provided. As would be understood by a person skilled in the art based on the teachings herein, embodiments are not limited to the example embodiments provided herein, but extend to any variations or improvements thereof that would be apparent to a person of skill in the art.

Figure 2:
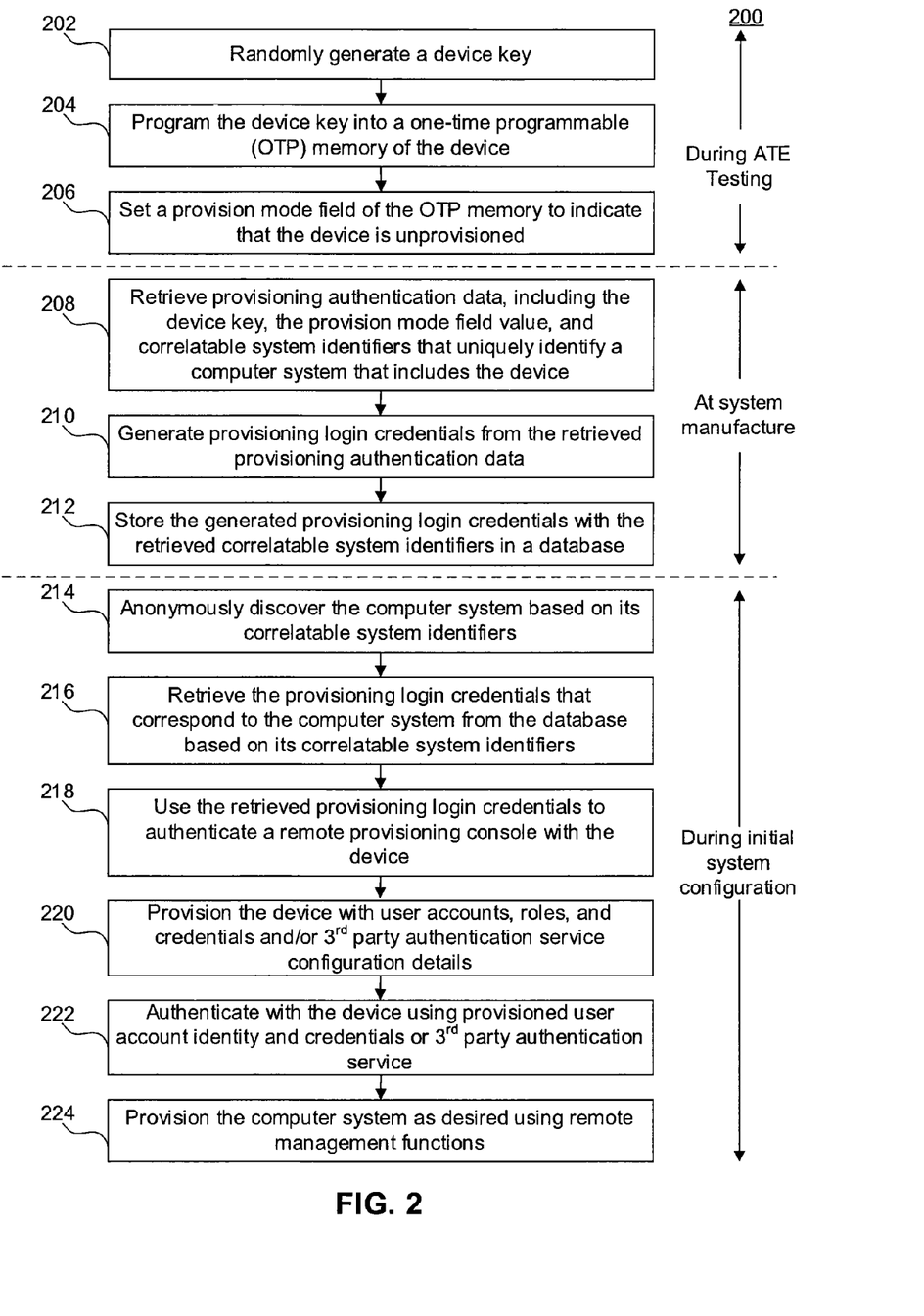
FIG. 2 is a process flowchart for enabling secure hands-free remote provisioning/management of a computer system according to an embodiment of the present invention.

FIG. 2 is an example process flowchart 200 for enabling secure hands-free remote provisioning/management of a computer system according to an embodiment of the present invention. Process flowchart 200 will be described with reference to FIG. 1. As shown in FIG. 2, process 200 includes steps 202-224.

In an embodiment, as show in FIG. 2, steps 202, 204, and 206 of process 200 are performed during ATE testing of the device in which the remote management controller 108 may be embedded. For example, in embodiments, the remote management controller 108 is embedded in a network controller chip (e.g., Ethernet controller) of the computer system 102. In other embodiments, the remote management controller 108 is embedded in the motherboard (e.g., Northbridge chipset) of the computer system 102. In another embodiment, steps 202, 204, and 206 are performed at system manufacture time by the computer system manufacturer. For example, embodiments of the present invention as will be further described below include a specialized diagnostic utility which is supplied generally to original equipment manufactures (OEMs) for the testing and configuration at system manufacture time of devices having embedded embodiments of the present invention. In an embodiment, steps 202, 204, and 206 can be performed using this specialized diagnostic utility. In a further embodiment, steps 202, 204, and 206 are performed by the remote management controller manufacturer prior to customer (e.g., computer system manufacturer) delivery of the remote management controller.

In particular, step 202 includes randomly generating a device key associated with the device (or more particularly with the remote management controller 108). In an embodiment, the device key is pseudo-randomly generated. Subsequently, step 204 includes programming the device key into a one-time programmable (OTP) memory of the remote management controller 108. In an embodiment, a duplicate copy of the device key is also programmed in the OTP memory as a backup in case of OTP cell failures. Finally, in step 206, a provision mode field of the OTP memory is set so as to indicate that the remote management controller 108 is in an unprovisioned mode. As will be further described below, the provision mode field indicates whether the remote management controller 108 is currently provisioned or unprovisioned and the number of times that the remote management controller 108 has been provisioned previously. For example, in step 206, the provision mode field is set to indicate that the remote management controller 108 is unprovisioned and that it has not been provisioned before.

As will be further described below, the device key and the provision mode field value represent part of provisioning authentication data, which is used to derive provisioning login credentials that can be used by a remote provisioning/management console to remotely authenticate itself to the remote management controller 108 for the purpose of provisioning of the remote management controller 108.

Referring back to FIG. 2, steps 208, 210, and 212 are performed at system manufacture time. In other words, steps 208, 210, and 212 are performed by a computer system manufacturer at the time that the device containing the remote management controller 108 is embedded into a computer system 102. Particularly, step 208 includes retrieving provisioning authentication data, including the device key, the provision mode value, and correlatable system identifiers that uniquely identify the computer system 102 in which the device is embedded. In an embodiment, the correlatable system identifiers include a media access controller (MAC) address and a Globally Unique Identifier (GUID) associated with the computer system.

Step 210 includes generating provisioning login credentials from the retrieved provisioning authentication data. The provisioning login credentials can be used by a remote provisioning/management console 106 to authenticate itself to the remote management controller 108 for the purpose of provisioning of the remote management controller 108. In an embodiment, the provisioning login credentials include a username (in an embodiment, the username is hard-coded as "ProvisionConsole" and is not modifiable) and a password derived from the device key and the provision mode value. In an embodiment, the password is generated as a hash of the device key, the provision mode value, and optionally proprietary static data. In an embodiment, the provisioning password consists of 32 lowercase hexadecimal characters and is treated case sensitively by the remote management controller firmware.

Finally, in step 212, the generated provisioning login credentials are stored with the retrieved correlatable system identifiers in a database, which associates the provisioning login credentials of each remote management controller 108 with the computer system 102 in which the remote management controller 108 is embedded.

At the time of sale of the computer system, the computer system manufacturer or vendor provides the provisioning login credentials associated with the computer system 102 to the end-customer. The end-customer may store the provisioning login credentials in a database accessible to a remote provisioning/management console 106. The end-customer (e.g., end-customer IT personnel) then uses the provisioning login credentials to authenticate a remote provisioning/management console 106 to the remote management controller 108 and to securely provision the remote management controller 108 (i.e., set up the remote management controller 108 with one or more user accounts/role with corresponding authentication details). In an embodiment, this is done according to steps 214, 216, 218, and 220 of process 200. Subsequently, the same or a different remote provisioning/management console can authenticate with the remote management controller 108 using one of the provisioned user accounts to provision the computer system as desired, as described further below with respect to steps 222 and 224 of process 200.

In particular, in step 214, the computer system 102 is anonymously discovered by the remote provisioning/management console 106 based on its correlatable system identifiers. In an embodiment, the computer system discovery process includes sending a Web Services for Management (WS-Management) Identify request from the remote provisioning/management console 106 and receiving a WS-Management Identify response from the remote management controller 108, with the WS-Management Identify response including the correlatable system identifiers of the computer system 102. According to an embodiment, the correlatable system identifiers include the MAC address and the GUID of the computer system 102. In other embodiments, other correlatable system identifiers can be used. It is noted that step 214 is possible because the remote management controller 108 is enabled at manufacture time according to embodiments of the present invention. Further, according to an embodiment, in order for the remote management controller 108 to have access to the GUID of the computer system 102, the SMBIOS structure table of the computer system 102 is propagated at manufacture time to a non-volatile random access memory (NVRAM) associated with the remote management controller 108.

When the remote provisioning/management console 106 receives the correlatable system identifiers of the computer system 102, the remote provisioning/management console 106 can locate the computer system 102. In an embodiment, as in step 216, the remote provisioning/management console 106 retrieves the provisioning login credentials that correspond to the computer system 102 from a database available to the remote provisioning/management console 106. Then, in step 218, the remote provisioning/management console 106 uses the retrieved provisioning login credentials to authenticate itself to the remote management controller 108 embedded in the computer system 102. Once successfully authenticated, in step 220, the remote provisioning/management console 106 can then provision the remote management controller 108 as desired (i.e., set up the remote management controller 108 with one or more user accounts/roles and corresponding authentication details and/or $3^{rd}$ party authentication service (e.g., Kerberos/Active Directory service) configuration details). In an embodiment, provisioning the remote management controller with $3^{rd}$ party authentication service configuration details includes setting up the authentication service configuration parameters in the remote management controller's NVRAM (including one or more user roles, but no user accounts). One advantage to such implementation is that it obviates the need for user accounts locally stored in the remote management controller's NVRAM.

Subsequently, in step 222, remote provisioning/management console 106 or another provisioning/management console can authenticate itself with the remote management controller 108 using one of the provisioned user accounts or using $3^{rd}$ party authentication service (e.g., using an Active Directory identity), which automatically transitions the remote management controller to a provisioned mode.

Once successfully authenticated, in step 224, remote provisioning/management console 106 or the other provisioning/management console can provision/manage the computer system 102 as desired using remote management functions (e.g., power control, boot control, boot media redirection, console redirection, etc.)

As would be understood by a person skilled in the art based on the teachings herein, other variations of process 200 can be envisioned and are also within the scope of embodiments of the present invention. For example, as described above, process 200 uses provisioning login credentials derived from the provisioning authentication data for authenticating the remote provisioning/management console 106 to the remote management controller 108. In other variations, the provisioning authentication data itself or other types of derived credentials can be used.

Figure 3:
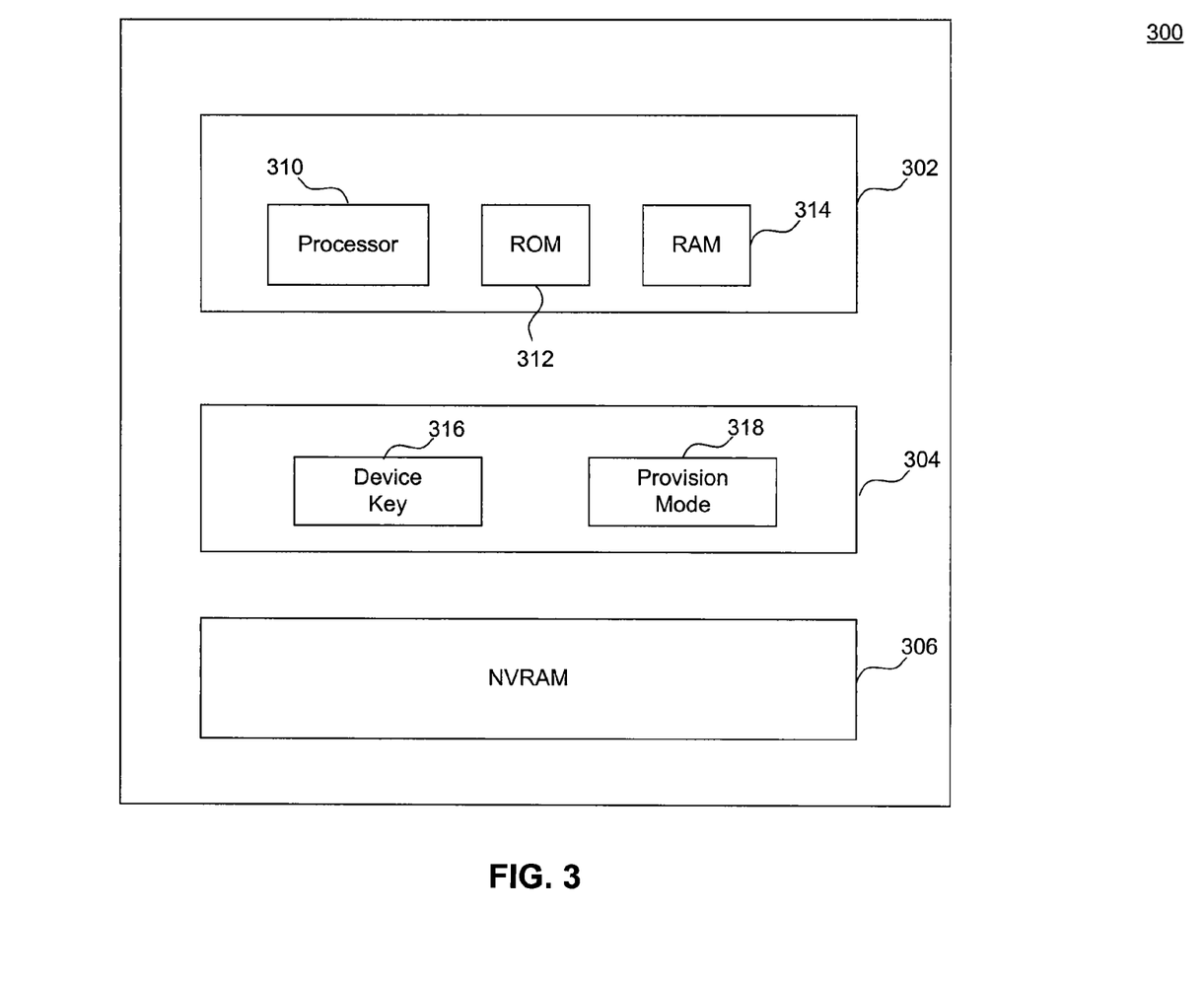
FIG. 3 illustrates an example implementation of an embodiment of the present invention.

FIG. 3 illustrates an example implementation 300 of an embodiment of the present invention. Example implementation 300 includes a remote management controller 302, OTP memory 304, and NVRAM 306. When embedded in a computer system (e.g., laptop, desktop, workstation, servers, etc.), example implementation 300 enables zero-touch secure remote provisioning/management of the computer system.

Remote management controller 302 is an example implementation of remote management controller 108, described above. As shown in FIG. 3, remote management controller 302 includes a processor 310, read-only memory (ROM) 312, and random access memory (RAM) 314. OTP memory 304 includes a device key field 316 for holding a device key and a provision mode field 318 for holding a provision mode value. In an embodiment, device key field 316 is 64 bit long, and provision mode field 318 is 63 bit long. Other field sizes can also be used in other embodiments.

In an embodiment, RAM 314 is used to load management firmware from NVRAM 306. When executed by processor 310, the management firmware causes processor 310 to perform various functions of remote management controller 302, including advertising correlatable system identifiers of the computer system embedding remote management controller 302, authenticating a remote provisioning/management console 106 seeking to provision remote management controller 302, and transitioning remote management controller 302 to a provisioned mode upon successful provisioning of remote management controller 302 by a remote provisioning/management console.

In particular, in advertising the correlatable system identifiers of the computer system, the management firmware causes processor 310 to read the correlatable system identifiers from NVRAM 306, to embed the correlatable system identifiers in a WS-Management Identify response, and to send the WS-Management Identify response to the remote provisioning/management console.

Figure 4:
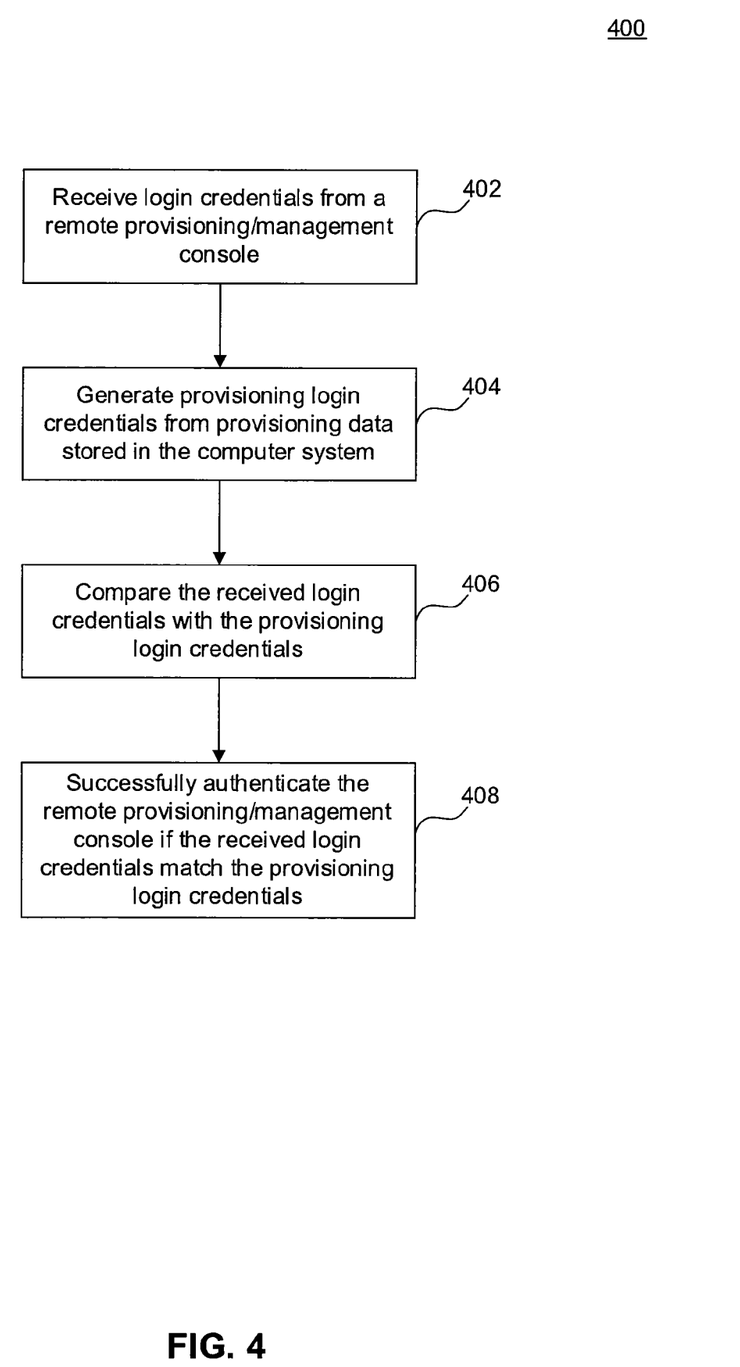
FIG. 4 is a process flowchart according to an embodiment of the present invention.

In an embodiment, to authenticate a remote provisioning/management console 106, the firmware causes processor 310 to perform the steps of process 400 shown in FIG. 4.

Process 400 begins in step 402, which includes receiving login credentials from a remote provisioning/management console. In an embodiment, the login credentials are received as part of an HTTP digest authentication request.

Step 404 includes generating provisioning login credentials from provisioning authentication data stored in the computer system. In an embodiment, the management firmware causes processor 310 to read the device key and the provision mode value from device key field 316 and provision mode field 318 respectively of the OTP memory, and to dynamically calculate provisioning login credentials based on the device key and the provision mode value (i.e., dynamically calculate a provisioning password).

Subsequently, step 406 includes comparing the login credentials received from the remote provisioning/management console 106 with the generated provisioning login credentials.

If the received login credentials match the provisioning login credentials, the remote provisioning/management console 106 is successfully authenticated to the remote management controller 302. Subsequently, the remote provisioning/management console 106 can provision the remote management controller 302 as desired, including setting up one or more user accounts/roles with corresponding authentication details. Using one of the provisioned user accounts, the same remote provisioning/management console 106 or a different console can then authenticate itself to the remote management controller 302 for the purpose of provisioning/managing the computer system as desired.

In an embodiment, the management firmware causes processor 310 to transition the remote management controller 302 to a provisioned mode upon successful authentication using one of the provisioned user accounts of the remote provisioning/management console 106. In particular, once the remote provisioning/management console 106 is successfully authenticated using one of the provisioned user accounts, the firmware causes processor 310 to change the value of provision mode field 318 to indicate that the remote management controller 302 has been provisioned. In an embodiment, this renders obsolete the provisioning login credentials (in particular, the provisioning password) and disables further authentication using the provisioning login credentials by processor 310 until the remote management controller 302 is transitioned subsequently to unprovisioned mode (no valid provisioning credentials exist when the remote management controller 302 is in provisioned mode).

According to an embodiment, the provision mode field is 63 bit long, with all bits at manufacture time set to zero (or some other pre-determined value) by default to indicate that the remote management controller 302 is unprovisioned and has never been provisioned previously. When the remote management controller 302 is transitioned from unprovisioned to provisioned mode (or vice versa), the next available zero bit in the provision mode field is set to "1." Accordingly, an even number of "1" bits in the provision mode field indicates that the remote management controller 302 is unprovisioned, while an odd number of "1" bits indicates that the remote management controller 302 is provisioned. Once all 63 bits of the provision mode value are set, the remote management controller 302 may no longer be unprovisioned. It is noted that a provision mode field of 63 bits allows 31 unprovisioned to provisioned mode transitions, which is much more than the anticipated needs of customers or end users.

Generally, it is envisioned that the remote management controller will be transitioned from provisioned mode to unprovisioned mode by the computer system manufacturer or vendor before it is redeployed to a new customer. In embodiments, this is done using specialized software or in conjunction with the firmware described above. New previously-unused provisioning login credentials are associated with the computer system when the remote management controller is transitioned from provisioned mode to unprovisioned mode. It is noted that, according to embodiments, each transition from provisioned to unprovisioned mode changes the dynamically-calculated provisioning password, which in an embodiment is calculated based on a hash of the device key, the provision mode value, and proprietary static data.

Embodiments of the present invention include a specialized diagnostic utility which is supplied generally to original equipment manufactures (OEMs) for the testing and configuration at system manufacture time of devices having embedded embodiments of the present invention. Among other functions, the diagnostic utility may be used to propagate the system's SMBIOS structure table to NVRAM accessible by the management firmware. As such, the firmware will have access to the system's GUID to be used as a correlatable identifier. Furthermore, using command-line switches and interactive commands, the diagnostic utility has the ability to read and display the current remote management controller provisioning mode and provisioning password, as well as transition the remote management controller from provisioned mode to unprovisioned mode or vice versa by incrementing the provision mode value.

Another use of the diagnostic utility is by the OEM to harvest provisioning authentication data associated with embodiments of the present invention. As described above, in an embodiment, the provisioning authentication data includes the system's MAC address and GUID and the provisioning password of the remote management controller. In an embodiment, the diagnostic utility supports a command that can be used to capture provisioning authentication data from a device and to redirect the captured data to a file. In an embodiment, the command includes program logic which when executed by a processor causes the processor to perform the steps of process 500 shown in FIG. 5.

Figure 5:
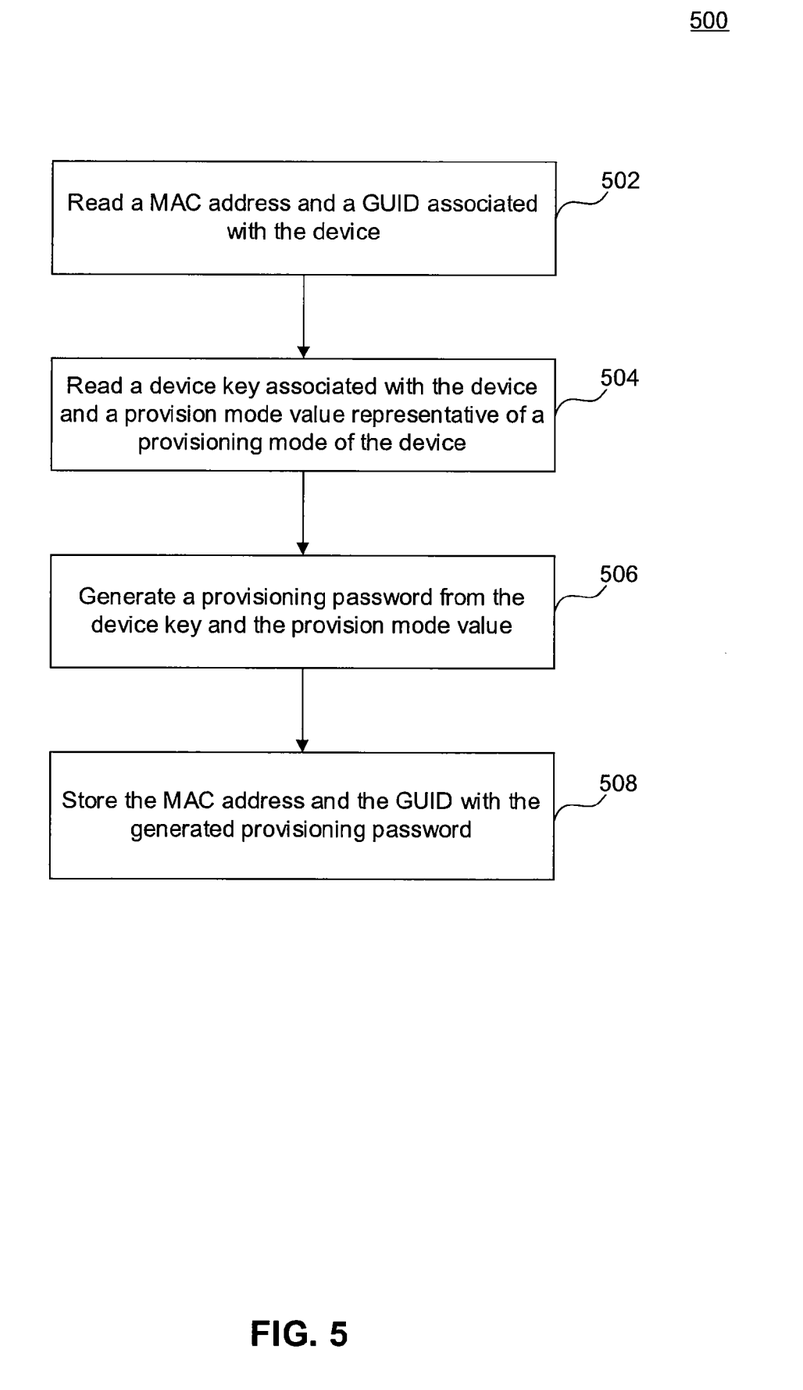
FIG. 5 is a process flowchart according to an embodiment of the present invention.

In particular, in step 502, the program logic causes the processor to read a MAC address and a GUID associated with the device (i.e., the MAC address and GUID of the computer system in which the device is embedded). In step 504, the program logic causes the processor to read a device key associated with the device and a provision mode value representative of a provisioning mode of the device. In an embodiment, step 504 includes reading the device key and the provision mode value from OTP memory of the device. In step 506, the program logic causes the processor to generate a provisioning password from the device key and the provision mode value. Finally, in step 508, the program logic causes the processor to store the read MAC address and GUID with the generated provisioning password. In an embodiment, the MAC address, GUID, and the generated provisioning are stored in a database, which is subsequently provided to the end-customer.

According to another embodiment, the diagnostic utility can be used by the system manufacturer to generate and program a device key in the OTP memory of the device and to set the provision mode field of the device.

Figure 6:
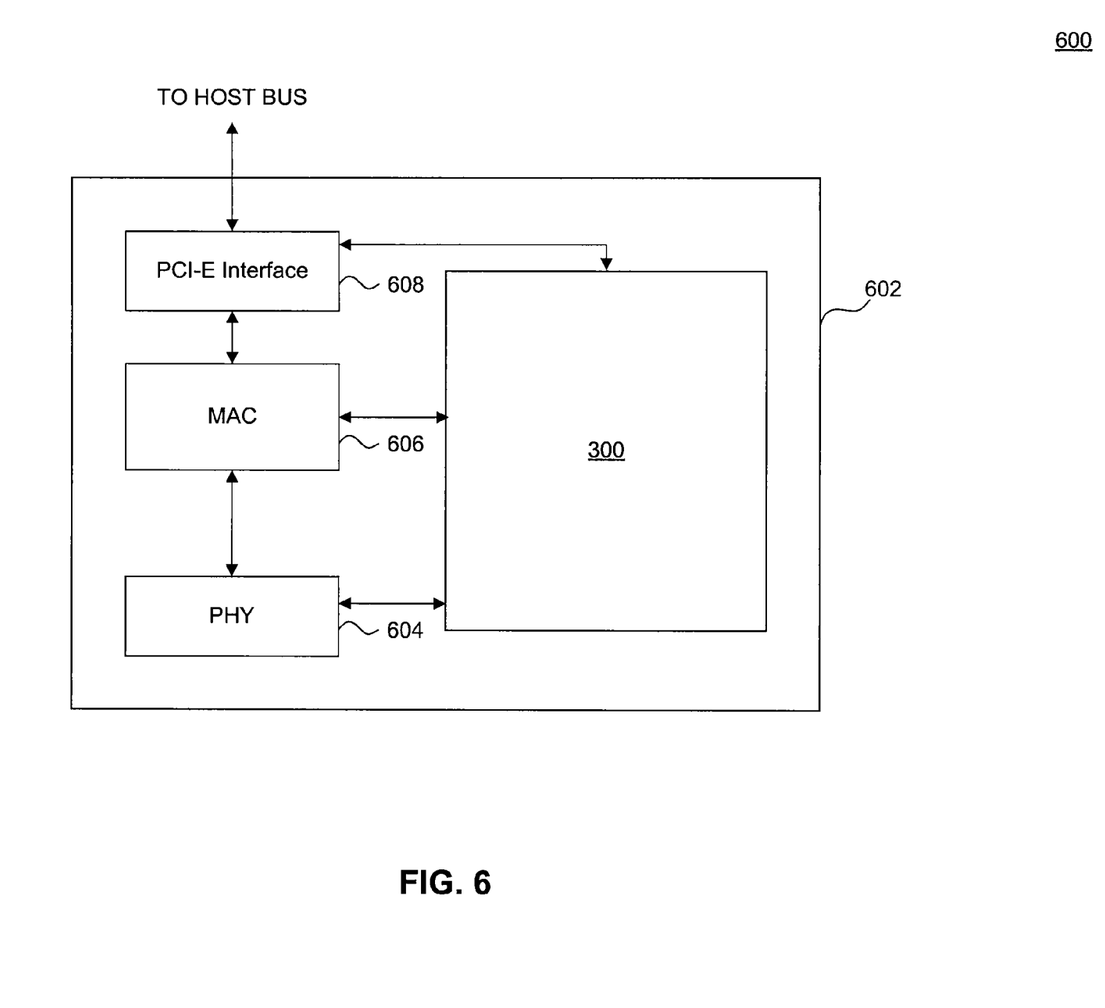
FIG. 6 illustrates an example implementation of an embodiment of the present invention.

FIG. 6 is an example implementation 600 of an embodiment of the present invention. In particular, example implementation 600 represents a network controller implementation according to an embodiment of the present invention. As such, example implementation 600 embeds the above described example implementation 300 in a network controller 602 (e.g., Ethernet controller). As shown in FIG. 6, the network controller 602 includes a PHY 604, a MAC 606, and a PCI-E interface 608. In an embodiment, example implementation 300 communicates with PHY 604, MAC 606, and PCI-E interface 608.

Figure 7:
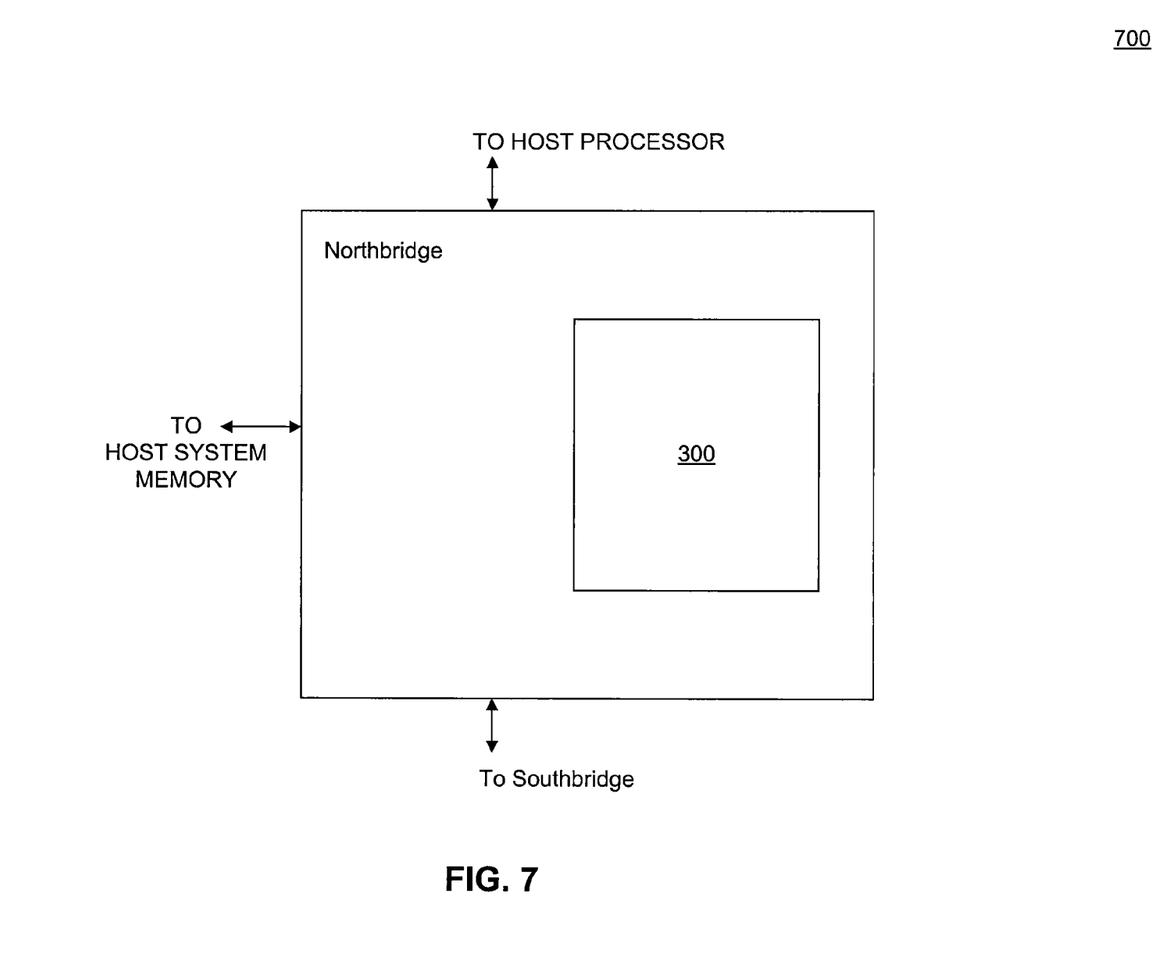
FIG. 7 illustrates an example implementation of an embodiment of the present invention.

FIG. 7 is an example implementation 700 of an embodiment of the present invention. In particular, example implementation 700 represents a motherboard implementation according to the present invention. As such, example implementation 700 embeds the above described example implementation 300 in the motherboard chipset (e.g., Northbridge) of a computer system's motherboard.

Figure 8:
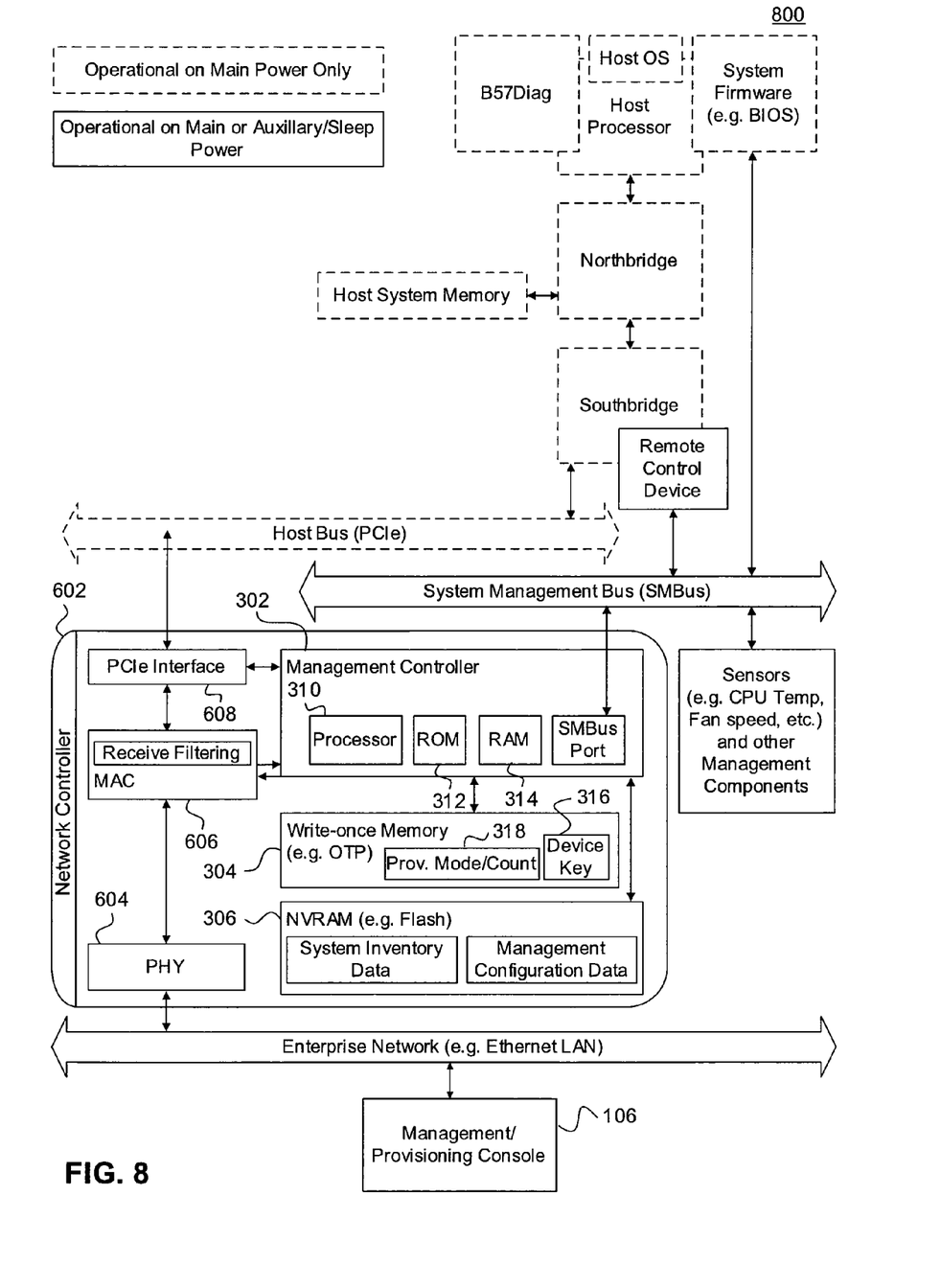
FIG. 8 illustrates an example implementation of an embodiment of the present invention.

FIG. 8 is an example implementation 800 of an embodiment of the present invention. In particular, example implementation 800 represents a detailed system wide network controller implementation according to an embodiment of the present invention.

Figure 9:
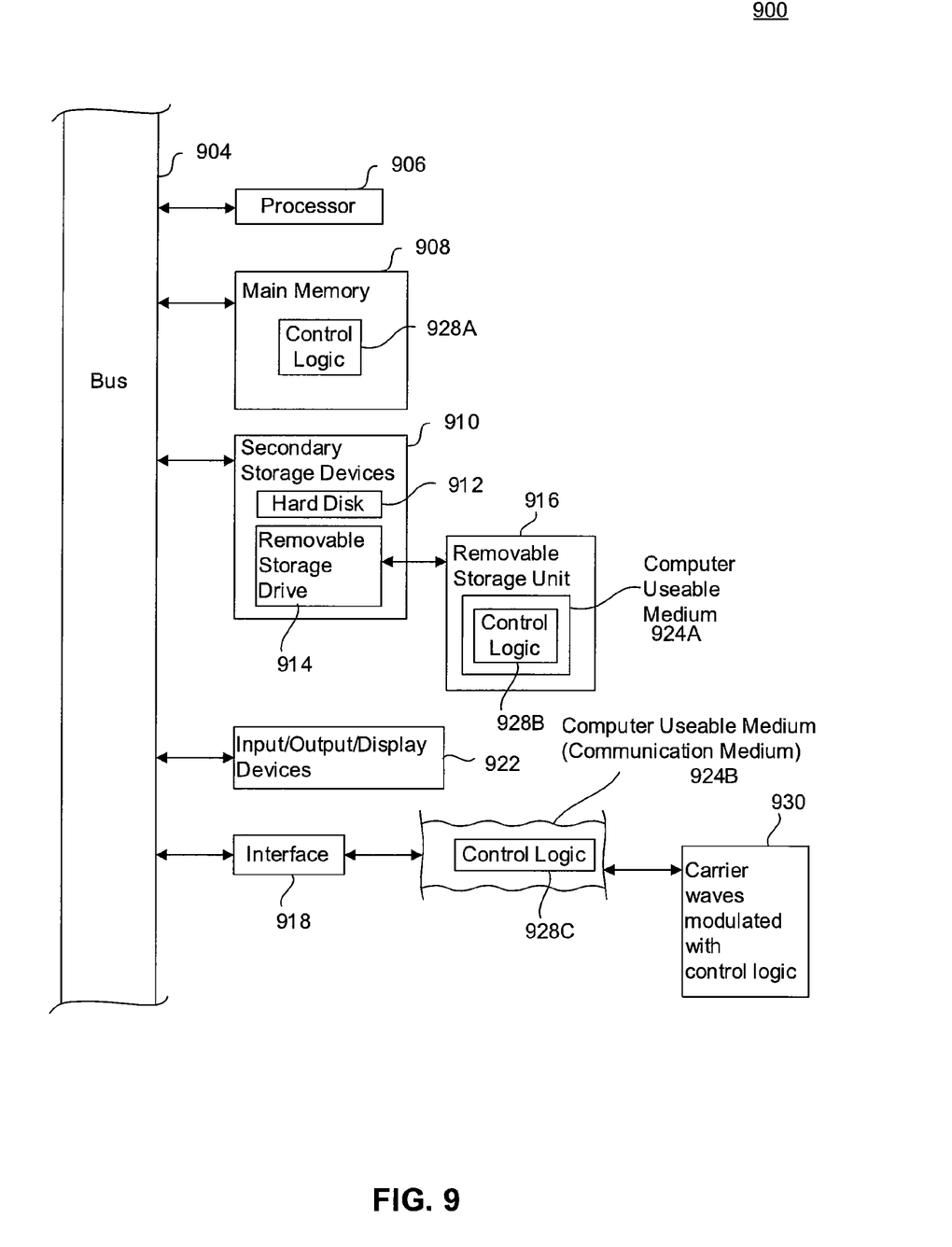

Various aspects of embodiments of the present invention can be implemented by software, firmware, hardware, or a combination thereof. FIG. 9 illustrates an example computer system 900 in which embodiments of the present invention, or portions thereof, can be implemented as computer-readable code. For example, the methods illustrated by flowcharts 200, 400, and 500 can be implemented in system 900. Various embodiments of the invention are described in terms of this example computer system 900. After reading this description, it will become apparent to a person skilled in the relevant art how to implement the invention using other computer systems and/or computer architectures.

Computer system 900 can be any commercially available and well known computer capable of performing the functions described herein, such as computers available from International Business Machines, Apple, Sun, HP, Dell, Compaq, Digital, Cray, etc.

The computer 900 includes one or more processors (also called central processing units, or CPUs), such as a processor 906. The processor 906 is connected to a communication bus 904.

The computer 900 also includes a main or primary memory 908, such as random access memory (RAM). The primary memory 908 has stored therein control logic 928A (computer software), and data.

The computer 900 also includes one or more secondary storage devices 910. The secondary storage devices 910 include, for example, a hard disk drive 912 and/or a removable storage device or drive 914, as well as other types of storage devices, such as memory cards and memory sticks. The removable storage drive 914 represents a floppy disk drive, a magnetic tape drive, a compact disk drive, an optical storage device, tape backup, etc.

The removable storage drive 914 interacts with a removable storage unit 916. The removable storage unit 916 includes a computer useable or readable storage medium 924A having stored therein computer software 928B (control logic) and/or data. Removable storage unit 916 represents a floppy disk, magnetic tape, compact disk, DVD, optical storage disk, or any other computer data storage device. The removable storage drive 914 reads from and/or writes to the removable storage unit 916 in a well known manner.

The computer 900 also includes input/output/display devices 922, such as monitors, keyboards, pointing devices, etc.

The computer 900 further includes a communication or network interface 918. The network interface 918 enables the computer 900 to communicate with remote devices. For example, the network interface 918 allows the computer 900 to communicate over communication networks or mediums 924B (representing a form of a computer useable or readable medium), such as LANs, WANs, the Internet, etc. The network interface 918 may interface with remote sites or networks via wired or wireless connections.

Control logic 928C may be transmitted to and from the computer 900 via the communication medium 924B. More particularly, the computer 900 may receive and transmit carrier waves (electromagnetic signals) modulated with control logic 930 via the communication medium 924B.

Any apparatus or manufacture comprising a computer useable or readable medium having control logic (software) stored therein is referred to herein as a computer program product or program storage device. This includes, but is not limited to, the computer 900, the main memory 908, the secondary storage devices 910, the removable storage unit 916 and the carrier waves modulated with control logic 930. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A remote management controller, comprising:
   one-time-programmable (OTP) memory that stores provisioning authentication data associated with the remote management controller; and
   random access memory (RAM) that stores program logic associated with the remote management controller, wherein the program logic authenticates a remote provisioning console using the provisioning authentication data before allowing said remote provisioning console to provision the remote management controller,
   wherein the provisioning authentication data includes a device key associated with the remote management controller and a provision mode value representative of a provisioning mode of the remote management controller.

2. The remote management controller of claim 1, wherein the OTP memory stores a duplicate copy of the device key.

3. The remote management controller of claim 1, wherein the device key is pseudo-randomly generated and programmed in the OTP memory during electrical testing of the remote management controller.

4. The remote management controller of claim 1, wherein the provision mode value indicates whether the remote management controller is currently provisioned or unprovisioned and a number of times that the remote management controller has been provisioned.

5. The remote management controller of claim 1, wherein the program logic authenticates the remote provisioning console by comparing login credentials provided by the remote provisioning console with provisioning login credentials associated with the remote management controller, the provisioning login credentials including a username and a password derived from the device key and the provision mode value of the remote management controller.

6. The remote management controller of claim 5, wherein the program logic changes the provision mode value after the remote provisioning console provisions the remote management controller, to transition the remote management controller to a provisioned mode.

7. The remote management controller of claim 6, wherein the provisioning login credentials are rendered obsolete and no valid provisioning login credentials are associated with the remote management controller when the remote management controller is transitioned to the provisioned mode.

8. The remote management controller of claim 6, wherein further authentication by the program logic using the provisioning login credentials is disabled once the remote management controller is transitioned to the provisioned mode.

9. The remote management controller of claim 5, wherein the program logic changes the provision mode value to indicate an unprovisioned mode when the remote management controller is transitioned from a provisioned mode to an unprovisioned mode.

10. The remote management controller of claim 9, wherein new previously-unused provisioning login credentials are associated with the remote management controller when the remote management controller is transitioned from a provisioned mode to an unprovisioned mode.

11. The remote management controller of claim 1, wherein the program logic enables the remote management controller to advertise correlatable system identifiers of a computer system associated with the remote management controller, thereby allowing the remote provisioning console to discover the computer system.

12. The remote management controller of claim 11, wherein the correlatable system identifiers include a media access controller (MAC) address and a Globally Unique Identifier (GUID) associated with the computer system.

13. The remote management controller of claim 1, wherein the program logic enables the remote provisioning console, once successfully authenticated, to configure the remote management controller.

14. The remote management controller of claim 1, wherein the program logic enables the remote provisioning console once successfully authenticated, to set up one or more user accounts and corresponding authentication details in the remote management controller.

15. The remote management controller of claim 1, wherein the remote management controller enables hands-free secure remote provisioning of the remote management controller.

16. The remote management controller of claim 1, wherein the remote management controller is embedded in a network controller of a computer system.

17. The remote management controller of claim 1, wherein the remote management controller is embedded in a motherboard of a computer system.

18. The remote management controller of claim 1, wherein the remote management controller is embedded in a personal computer.

19. The remote management controller of claim 1, wherein the remote management controller is embedded in a server.

20. The remote management controller of claim 1, wherein the RAM is non-volatile RAM (NVRAM).

21. A computer program product comprising a non-transitory computer useable medium having program logic stored thereon that, when executed by a processor, causes the processor to perform a method for authenticating a remote provisioning console before allowing the remote provisioning console to provision a remote management controller, the method comprising:
   receiving, at the remote management controller, login credentials from the remote provisioning console;
   generating, at the remote management controller, provisioning login credentials from provisioning authentication data stored in a memory of the remote management controller; and
   comparing, at the remote management controller, the received login credentials with the provisioning login credentials,
   wherein the provisioning authentication data includes a device key associated with the remote management controller and a provision mode value representative of a provisioning mode of the remote management controller.

22. The computer program product of claim 21, wherein the provision mode value indicates whether the remote management controller is currently provisioned or unprovisioned and a number of times that the remote management controller has been provisioned.

23. The computer program product of claim 21, wherein said comparing comprises comparing a username and a password provided by the remote provisioning console with a known username and a password derived from the device key and the provision mode value of the remote management controller.

24. The computer program product of claim 21, wherein the method further comprises:
changing the provision mode value after the remote provisioning console provisions the remote management controller, to transition the remote management controller to a provisioned mode.

25. The computer program product of claim 24, wherein the provisioning login credentials are rendered obsolete and no valid provisioning login credentials are associated with the remote management controller when the remote management controller is transitioned to the provisioned mode.

26. The computer program product of claim 21, wherein the method further comprises:
changing the provision mode value to indicate an unprovisioned mode when the remote management controller is transitioned from a provisioned mode to an unprovisioned mode.

27. The computer program product of claim 21, wherein the method further comprises advertising correlatable system identifiers of a computer system associated with the remote management controller, thereby allowing the remote provisioning console to discover the computer system.

28. The computer program product of claim 27, wherein the correlatable system identifiers include a media access controller (MAC) address and a Globally Unique Identifier (GUID) associated with the computer system.

29. A computer program product comprising a non-transitory computer useable medium having program logic stored thereon that, when executed by a processor, causes the processor to perform a method for extracting authentication data from a device, the method comprising:
reading a media access controller (MAC) address and a Globally Unique Identifier (GUID) associated with the device;
reading a device key associated with the device and a provision mode value representative of a provisioning mode of the device;
generating a provisioning password from the device key and the provision mode value; and
storing the MAC address and GUID with the generated provisioning password in a database.

30. The computer program product of claim 29, wherein the method further comprises:
displaying the MAC address, GUID, and the provisioning password.

31. The computer program product of claim 29, wherein the method further comprises:
changing the provision mode value to transition the device from a provisioned mode to an unprovisioned mode.

32. The computer program product of claim 29, wherein the device includes a remote management controller.

\* \* \* \* \*